(12) United States Patent
Braithwaite

(10) Patent No.: US 12,422,058 B2
(45) Date of Patent: Sep. 23, 2025

(54) METHOD AND APPARATUS FOR EXTRACTION OF SUBTERRANEAN PIPE

(71) Applicant: Andrew M. Braithwaite, Ennismore (CA)

(72) Inventor: Andrew M. Braithwaite, Ennismore (CA)

( * ) Notice: Subject to any disclaimer, the term of this patent is extended or adjusted under 35 U.S.C. 154(b) by 316 days.

(21) Appl. No.: 18/308,250

(22) Filed: Apr. 27, 2023

(65) Prior Publication Data

US 2023/0349489 A1  Nov. 2, 2023

(30) Foreign Application Priority Data

Apr. 27, 2022 (CA) .................................. CA 3156550

(51) Int. Cl.
*F16L 1/032* (2006.01)
(52) U.S. Cl.
CPC .................................... *F16L 1/032* (2013.01)
(58) Field of Classification Search
CPC . H01G 1/08; F16L 1/032; B44B 5/047; B21C 37/06–30
See application file for complete search history.

(56) References Cited

U.S. PATENT DOCUMENTS

| | | | | |
|---|---|---|---|---|
| 1,775,555 A * | 9/1930 | Dorndorf | ................ | B21C 37/26 29/890.048 |
| 2,525,590 A * | 10/1950 | Collins | ................ | B29C 31/002 68/269 R |
| 4,044,444 A * | 8/1977 | Harris | ................... | B23P 19/022 29/727 |
| 4,570,705 A * | 2/1986 | Walling | ................... | F16L 11/22 166/77.2 |
| 5,621,966 A * | 4/1997 | Kvenvold | ............... | B25B 27/06 29/727 |
| 6,149,349 A * | 11/2000 | Nikiforuk | ............... | E02F 3/963 405/184 |
| 7,845,419 B2 * | 12/2010 | Naumann | ............. | E21B 17/206 166/380 |
| 11,773,653 B2 * | 10/2023 | Wang | ..................... | E21B 21/12 175/5 |

OTHER PUBLICATIONS

Roddie Underground equipment, https://roddieunderground.com/equipment/pipe-shark/, Pipe Shark, undated.
TT Technologies, https://www.tttechnologies.com/methods/split-pull/, Pipe Splitting Using The Grundosplit, undated.

* cited by examiner

*Primary Examiner* — Janine M Kreck
(74) *Attorney, Agent, or Firm* — Spencer Fane, LLP

(57) ABSTRACT

The present disclosure relates to machines and methods for subterranean pipe extraction. The pipe extractor is comprised of a first roller, a second roller radially opposed from the first roller, at least one motor configured to drive rotation of the first and second rollers in opposing directions, and a deflector positioned adjacent to the first and second rollers. The first roller and second roller are configured to receive a pipe between them, and the pipe is axially moveable into contact with the deflector upon rotation of the first and second rollers. One or both of the first and second rollers may be radially slidable towards and away from each other. The sliding movement of the rollers may be controlled by a hydraulic actuator. The pipe extractor may be used as a standalone unit, or it may be mounted on a construction vehicle such as an excavator.

19 Claims, 4 Drawing Sheets

METHOD AND APPARATUS FOR EXTRACTION OF SUBTERRANEAN PIPE

CROSS-REFERENCE TO RELATED APPLICATIONS

This application claims the benefit of Canadian Patent Application No. 3,156,550, filed Apr. 27, 2022, which is hereby incorporated herein by reference in its entirety.

BACKGROUND

The ground is filled with numerous pipes to transport fluids, such as natural gas, from one place to another, including into residential homes. These pipes may be made of different materials, and historically were made of steel. Many older steel pipes are aging and decaying, and it is desirable to replace them with newer, usually plastic, pipes.

One method of replacing the old pipe is to install the new pipe in the ground, while cutting off fluid flow to the old, abandoned pipe and leaving it in the ground. This creates a hazardous and inconvenient situation. Someone digging a hole may accidentally strike the abandoned pipe and be unable to recognize whether it is a "live pipe" or an "abandoned pipe". A service company would need to be called out to identify what are referred to as "false strikes", which can consume many man hours.

Further, the abandoned pipe could still contain a gas residue or stagnated ground water, which could also be a health and safety risk if the abandoned pipe were accidentally struck and pierced. While an abandoned pipe may be located with tools such as ground penetrating radar, this is not a precise method for determining whether the pipe is "in service". As a result, an abandoned pipe left in the ground may be mistakenly assumed to be "in service", which could impact an excavation design and could lead to a failure to locate the actual "in service" pipe.

It is more preferable to remove old pipe from the ground when installing new pipe. While there are technologies available that perform the task of removing old pipe from the ground, they suffer from drawbacks.

For example, some other technology operates with reciprocating strokes to pull the pipe out of the ground in short lengths, which can be cut into segments for disposal. This technology is slow and complex, and requires additional power to overcome the static friction of the old pipe in the ground with each stroke.

Some other technology has a cutting mechanism for bisecting the pipe as it is removed from the ground for ease of disposal, and still other technology requires a cable to be inserted into flexible piping in order to extract the pipe from the ground by winding a drum. However, these technologies are more appropriate for use in the removal of plastic or rubber pipes, and would not be efficient or effective at extracting steel pipe.

Therefore, there is a need for a simpler, more efficient apparatus and method for extracting subterranean pipe.

SUMMARY OF THE DISCLOSURE

According to one aspect, there is provided a subterranean pipe extractor comprising: a first roller; a second roller radially opposed from the first roller, the first roller and second roller configured to receive a pipe therebetween; at least one motor configured to drive rotation of the first and second rollers in opposing directions; and a deflector positioned adjacent to the first and second rollers, wherein the pipe is axially moveable into contact with the deflector upon rotation of the first and second rollers.

In an embodiment, the first roller is radially fixed and the second roller is radially slidable towards and away from the first roller. In a further embodiment, the pipe extractor further comprises a hydraulic actuator to control the sliding movement of the second roller.

In another embodiment, the first roller and second roller are radially slidable towards and away from each other. In a further embodiment, the pipe extractor further comprises at least one hydraulic actuator to control the sliding movement of the first and second rollers.

In an embodiment, the at least one motor comprises a first motor for driving rotation of the first roller and a second motor for driving rotation of the second roller.

In an embodiment, the pipe extractor further comprises a planar surface substantially perpendicular to the axis of the pipe for supporting the pipe extractor against the ground from which the pipe is being extracted.

In an embodiment, an outer surface of at least one of the first roller and second roller further comprises axially extending grooves.

In an embodiment, the pipe extractor further comprises a coupling for releasably mounting the pipe extractor to a construction vehicle.

According to another aspect, there is provided a method of extracting a subterranean pipe, the method comprising: positioning a pipe extractor adjacent to a leading end of the subterranean pipe, the pipe extractor comprising a first roller, a second roller radially opposed from the first roller, at least one motor configured to drive rotation of the first and second rollers in opposing directions, and a deflector positioned adjacent to the first and second rollers; feeding the leading end of the pipe between the first roller and the second roller; and actuating the at least one motor to drive rotation of the first and second rollers, wherein the rotation of the first and second rollers causes axial movement of the pipe and directs the pipe into contact with the deflector.

In an embodiment, the method further comprises the step of radially sliding the second roller towards the first roller to radially compress the pipe. In a further embodiment, the sliding movement of the second roller is controlled by a hydraulic actuator.

In another embodiment, the method further comprises the step of radially sliding the first and second rollers towards each other to radially compress the pipe. In a further embodiment, the sliding movement of the first and second rollers is controlled by at least one hydraulic actuator.

In an embodiment, the method further comprises the step of controlling the speed of the at least one motor.

In an embodiment, the at least one motor comprises a first motor for driving rotation of the first roller and a second motor for driving rotation of the second roller.

In an embodiment, the pipe extractor further comprises a planar surface substantially perpendicular to the axis of the pipe for supporting the pipe extractor against the ground from which the pipe is being extracted.

In an embodiment, the method further comprises the step of mounting the pipe extractor on a construction vehicle.

In an embodiment, the method further comprises the step of attaching a second pipe to a trailing end of the subterranean pipe being extracted.

DETAILED DESCRIPTION OF THE INVENTION

Figure 1:
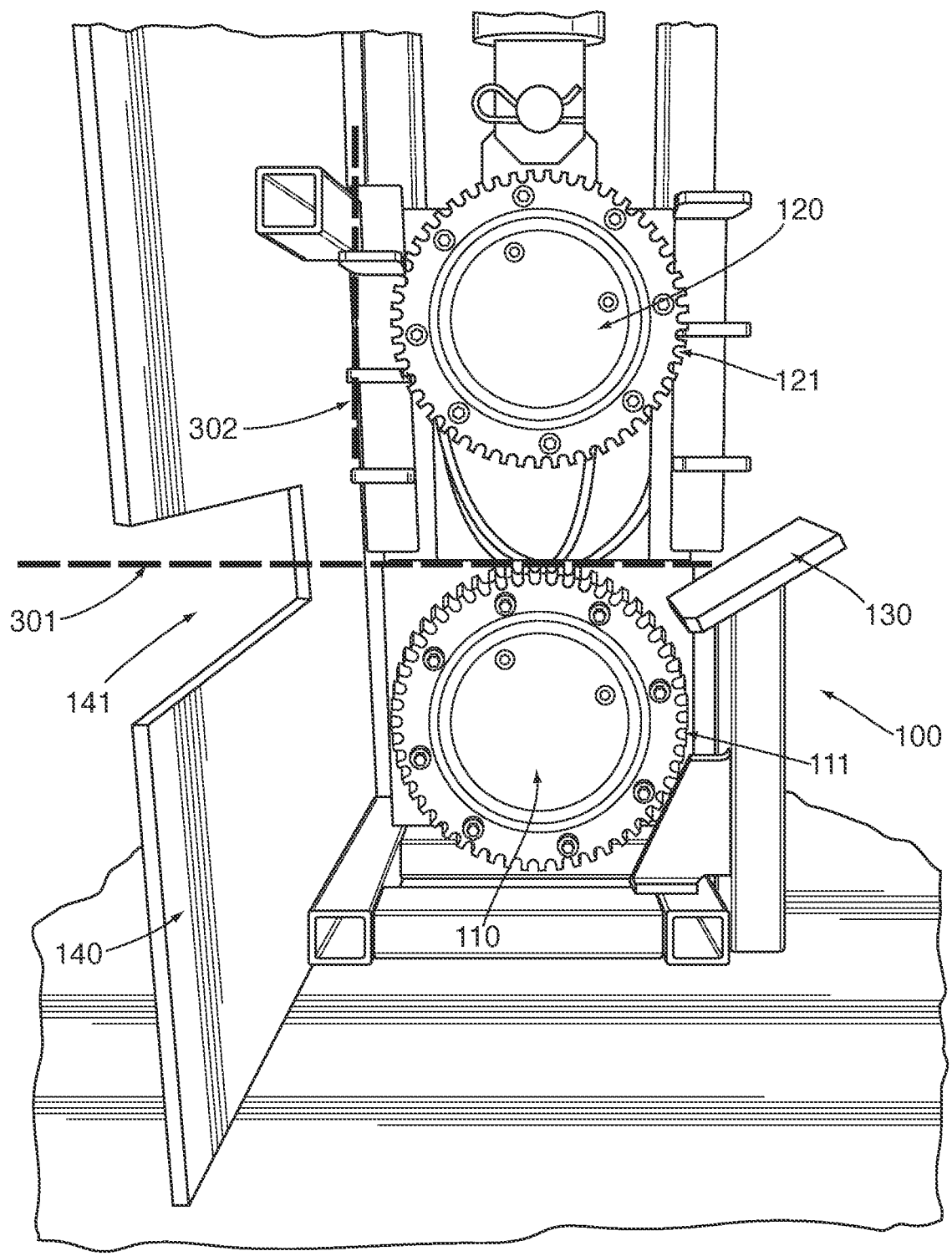
FIG. 1 is a side elevational view of the pipe extractor in accordance with an embodiment of the disclosure.
Figure 2:
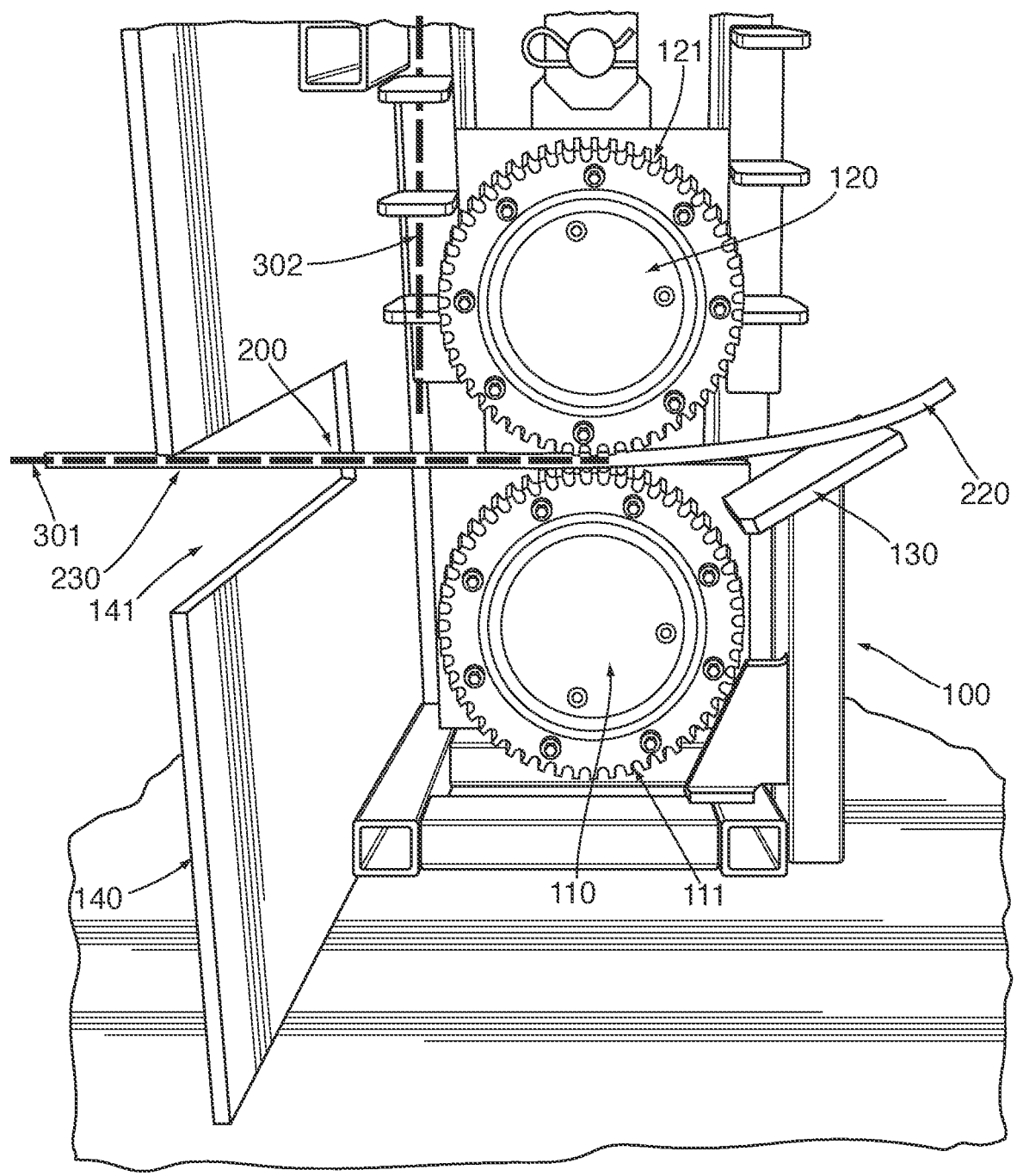
FIG. 2 is a perspective view of the pipe extractor of FIG. 1 with a pipe positioned between the rollers.
Figure 3:
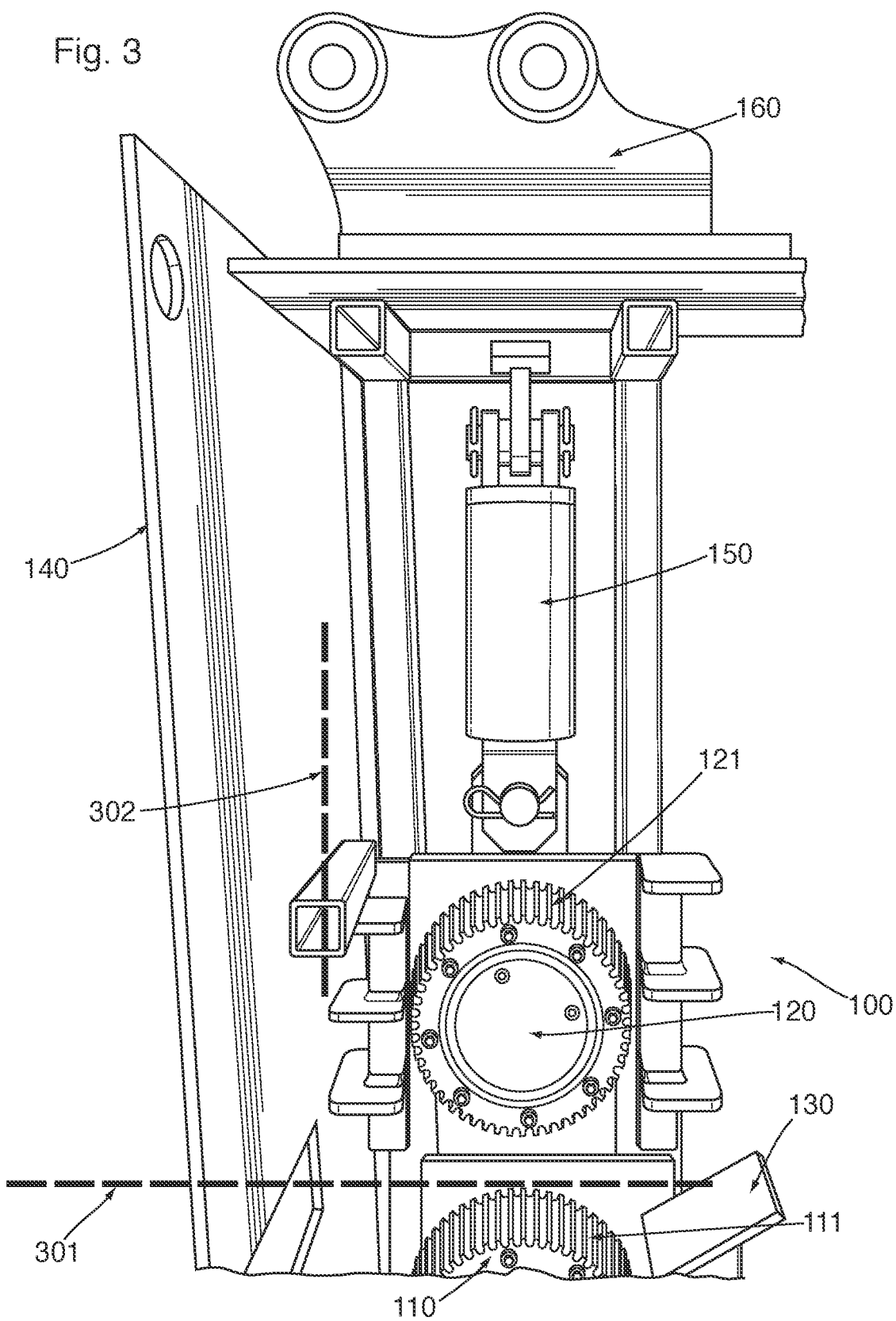
FIG. 3 is a side elevational view of a portion of the pipe extractor of FIG. 1 in accordance with an embodiment of the disclosure.

Referring to FIGS. 1-3, an exemplary embodiment of a pipe extractor 100 is depicted. In this embodiment, the pipe extractor 100 is shown in a vertical orientation for extracting horizontally oriented pipes from the ground (substantially along the axis of pipe movement 301).

In this orientation, the pipe extractor 100 may be lowered into an excavated pit where the end of a pipe 200 to be extracted has been exposed. Planar surface 140 may be placed against the ground along a wall of the excavated pit for supporting the pipe extractor 100 while it is in operation. Alternatively, in place of planar surface 140, pipe extractor 100 can be supported and held in place by stake downs, other holding devices, or simply the weight of the pipe extractor 100 itself.

The pipe extractor 100 may also be used in a horizontal orientation for extracting vertically oriented pipes from the ground, such as well pipes. In a horizontal orientation of the pipe extractor 100, the axis of pipe movement 301 is substantially vertical. Planar surface 140 may be placed on the ground to support the pipe extractor 100 while it is in operation.

In a preferred embodiment, as depicted in FIGS. 1-3, planar surface 140 is a large plate, preferably made of metal, that extends roughly the entire height of the pipe extractor 100. In this embodiment, an opening 141 allows the pipe 200 to pass from the ground through the planar surface 140 and into the pipe extractor 100. The skilled person will appreciate that, in embodiments where a planar surface 140 is used to support the pipe extractor 100, the planar surface 140 may be a smaller plate or other structure. For example, the planar surface 140 may be a small plate at the bottom of the pipe extractor 100, such that the top edge of the planar surface 140 is below the axis of pipe movement 301.

The pipe extractor 100 may be used as a standalone unit, or it may be mounted on a construction vehicle such as an excavator. Referring to FIG. 3, a coupling 160 is depicted on top of the pipe extractor 100 for connecting the pipe extractor 100 to the construction vehicle (not depicted).

The pipe extractor 100 has a first roller 110 and a second roller 120. These rollers 110, 120 are generally vertically aligned when the pipe extractor 100 is in a vertical orientation (as depicted in FIGS. 1-3) and are generally horizontally aligned when the pipe extractor 100 is in a horizontal orientation. The rollers 110, 120 are shown in FIGS. 1 and 3 with a relatively larger radial gap between them, and in FIG. 2 with a relatively smaller radial gap. As described in greater detail below, the radial gap between the rollers 110, 120 may be fixed or variable.

In one embodiment, the rollers 110, 120 may be rotationally mounted within the pipe extractor 100 such that they are rotatable about their respective axes, but in a radially fixed orientation. In this embodiment, the radial gap between the rollers 110, 120 is similarly fixed. The skilled person will appreciate that this fixed radial gap may be designed to be approximately the same diameter (or smaller) as the pipe 200 being extracted.

In a preferred embodiment, the rollers 110, 120 may be rotationally mounted within the pipe extractor 100 such that they are rotatable about their respective axes, and one or both of the rollers 110, 120 may further be radially slidable along an axis of roller movement 302. In one preferred embodiment, the first roller 110 is radially fixed, and the second roller 120 is radially slidable along the axis 302. In another preferred embodiment, the first roller 110 is radially slidable along the axis 302, and the second roller 120 is radially fixed. In yet another preferred embodiment, both rollers 110, 120 are radially slidable along the axis 302.

In these preferred embodiments, the radial sliding of one or both of rollers 110, 120 causes the radial gap between the rollers 110, 120 to correspondingly enlarge or contract. The amount of sliding movement may be controlled by the user to adjust the size of the gap between the rollers 110, 120. This allows the pipe extractor 100 to accommodate pipes 200 of varying diameters, which are preferably in the range of 0.5" to 2.5".

The radial sliding of one or both of the rollers 110, 120 may be controlled by hand operation or by some type of power unit. For example, with reference to FIG. 3, the radial sliding may be controlled by a hydraulic actuator such as hydraulic cylinder 150. When the hydraulic cylinder 150 depicted in FIG. 3 is extended, the second roller 120 slides radially toward the first cylinder 110. As depicted in FIG. 2, this forces the second roller 120 onto the pipe 200, crushing the pipe 200 between the rollers 110, 120 and flattening the pipe 200 to provide more surface area for the rollers 110, 120 to make contact with. The extension of the hydraulic cylinder 150 also maintains the radially compressive force on the pipe 200. When the hydraulic cylinder 150 is retracted, the second roller 120 slides radially away from the first roller 110.

The skilled person would appreciate that hydraulically actuated sliding of one or both of the rollers 110, 120 would provide significant additional compressive force on a pipe 200 that is fed between the rollers 110, 120, as depicted in FIG. 2. In this embodiment, the hydraulic cylinder 150 may have a controllable cylinder stroke and pressure to control the size of the radial gap between the rollers 110, 120 and the amount of force exerted on the pipe 200.

Figure 4:
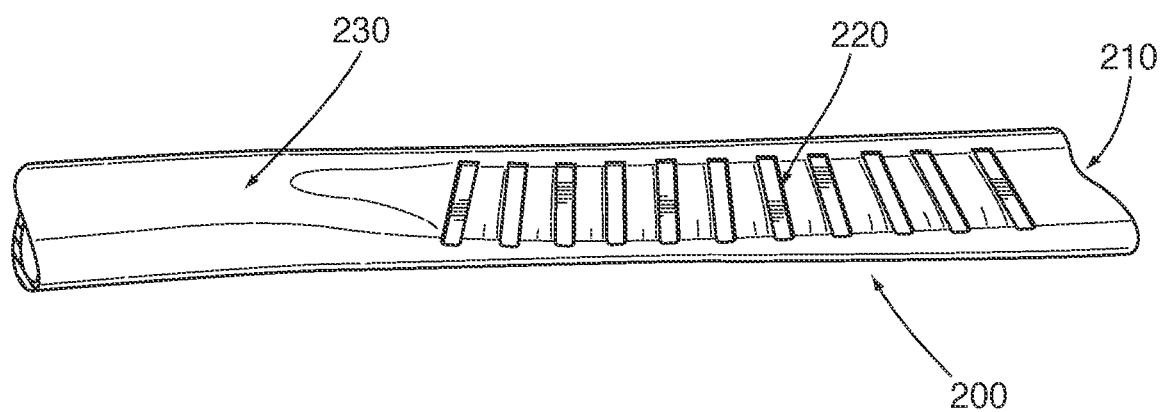
FIG. 4 is a perspective view of a pipe after a portion of it has passed through a pipe extractor in accordance with an embodiment of the disclosure.

Further, the adjustable gap between the rollers 110, 120 allows the pipe extractor 100 to exert radial compressive force on the pipe 200 as it is being extracted from the ground. With reference to FIG. 4, a pipe 200 is depicted that has been fed between the rollers 110, 120 and partially extracted. Starting from the leading end 210 of the pipe 200 that is fed between the rollers 110, 120, there is a crushed section 220 of pipe 200. This crushed section 220 has been subjected to the compressive force of the rollers 110, 120 as the pipe 200 is fed through. At a distal end from the leading end 210 of the pipe 200 is an uncrushed section 230, which has not yet been fed between the rollers 110, 120.

As can be seen in FIG. 4, the crushed section 220 of the pipe 200 provides the rollers 110, 120 additional surface area to grip the pipe 200. This allows for a more efficient extraction of the pipe 200 from the ground with minimal slippage between the rollers 110, 120 and the pipe 200.

In a preferred embodiment (depicted in FIGS. 1-3), an outer surface 111 of the first roller 110 and an outer surface 121 of the second roller 120 comprise grooves that are aligned with the axes of rollers 110, 120. The imprint of these grooves can be seen in the crushed section 220 of the pipe 200 in FIG. 4.

In an alternative embodiment, only one (or neither) of the outer surfaces 111, 121 of the rollers 110, 120 may comprise axial grooves. In further alternative embodiments, one or both of the outer surfaces 111, 121 may comprise radial grooves, raised pebbling, cross-hatching, carbide embedding, a concave surface, a convex surface, or a flat surface. The various possible designs of the rollers 110, 120 and their respective outer surfaces 111, 121 may allow the pipe extractor 100 to be used on various types of pipes (such as steel, other metals, or plastic) and even a wire rope.

The rotation of the rollers 110, 120 is driven by at least one motor (not depicted). The rollers 110, 120 are rotated in opposing directions (i.e. one clockwise and the other counter clockwise) in order to pull the pipe 200 between the rollers 110, 120, which extracts the pipe 200 from its subterranean environment.

In one embodiment, a single motor drives the rotation of both rollers 110, 120. As the skilled person will appreciate, there are various methods, such as a system of gears, to allow a single motor to drive opposing rotation of rollers 110, 120. However, in a preferred embodiment, a first motor drives the rotation of the first roller 110, and a second motor drives the rotation of the second roller 120.

The motor (or motors) may be capable of driving rotation of the rollers 110, 120 at variable speeds that can be controlled by the operator. These rotational speeds directly correlate to the linear travel speed of the pipe 200 between the rollers 110, 120 along the axis of pipe movement 301. In a preferred embodiment, the linear travel speed of the pipe 200 is approximately 20 feet per minute.

As the pipe 200 is pulled between the rollers 110, 120 in an axial direction along the axis of pipe movement 301, it is directed into contact with the deflector 130. The deflector 130 is an angled surface relative to the axis of pipe movement 301. As the skilled person will appreciate, the deflector 130 can be positioned at a variety of angles relative to the axis of pipe movement 301, and is preferably at about a 45 degree angle. As can be seen in FIG. 2, when the pipe 200 contacts the deflector 130, the vector of travel of the pipe 200 deflects from the axis of pipe movement 301, and approximates the angle of the deflector 130.

In the vertical orientation of the pipe extractor 100, this deflection prevents the pipe 200 from striking the wall of the excavation pit opposite from the subterranean environment that it is being extracted from. In the horizontal orientation of the pipe extractor 100, the deflection prevents the pipe 200 from forming an exceedingly tall and unwieldly column after it is extracted from the ground. As a result, the deflector 130 may allow the pipe extractor 100 to be operated continuously, such that the rollers 110, 120 continuously pull the pipe 200 out of the ground until it is completely extracted. It is not necessary to intermittently cease operation of the pipe extractor 100 to cut segments of the extracted pipe before continuing.

One advantage of the pipe 200 being continuously pulled by the rollers 110, 120 is the use of a reduced amount of power to extract the pipe 200. For example, if the pipe extractor 100 were operated intermittently, or if a pipe were being extracted by a reciprocating extractor, a static friction force between the pipe 200 and the surrounding subterranean environment would need to be overcome each time the extraction is recommenced.

It is also advantageous for the pipe extractor 100 to be able to continuously pull pipe 200, which may be made of steel, without the need for an internal cable or other device to add tensile strength to the pipe 200 being extracted.

Although the preferred embodiment includes two rollers (a first roller 110 and a second roller 120), the present disclosure contemplates the inclusion of one or more additional pairs of rollers (not depicted) adjacent to the rollers 110, 120. These additional rollers would provide the pipe extractor 100 with additional surface contact area and pulling power to be used on the pipe 200 during extraction.

While the pipe extractor 100 is primarily directed at extracting pipes 200 from a subterranean environment where they had been installed, it may also be used to simultaneously install a new pipe. The pipe 200 has a trailing end (not depicted) that is axially opposed from its leading end 210 (see FIG. 4). Prior to commencing operation of the pipe extractor 100, a second pipe (not depicted) may be attached to the trailing end of the pipe 200 being extracted. As pipe 200 is being fed between rollers 110, 120 and extracted from the ground, the second pipe will follow the route of pipe 200 and be installed with minimal disruption.

As can be seen from FIGS. 1-3, the pipe extractor 100 may have a small footprint when it is in a vertical orientation. This allows a smaller excavation pit to be dug at an end point of the pipe 200 being extracted, since the pipe extractor 100 does not require a significant amount of square footage to be placed into the pit. Further, the deflector 130 allows the pipe 200 being extracted to be redirected upward and out of the pit, thereby keeping the size requirements for the excavation pit to a minimum.

Although the invention has been described with reference to illustrative embodiments, it is to be understood that the invention is not limited to these precise embodiments. Numerous modifications, variations, and adaptations may be made to the particular embodiments of the invention described above without departing from the scope of the invention. The scope of the claims should not be limited by the preferred embodiments set forth in the examples, but should be given the broadest interpretation consistent with the description as a whole.

Immaterial modifications may be made to the embodiments described herein without departing from what is covered by the claims. The indefinite article "a" before a claim feature does not exclude more than one of the feature being present. Each of the individual features described here may be used in one or more embodiments and is not, by virtue only of being described here, to be construed as essential to all embodiments as defined by the claims.

What is claimed is:

1. A subterranean pipe extractor for removing a buried pipe from ground, the pipe extractor comprising:
   a first roller;
   a second roller radially opposed from the first roller, the first roller and second roller configured to receive a pipe therebetween;
   at least one motor configured to drive rotation of the first and second rollers in opposing directions; and
   a deflector positioned adjacent to the first and second rollers,
   wherein the pipe extractor is positioned in an excavation pit in the ground such that the pipe is removed from the ground through a wall of the excavation pit opposite the deflector, and
   wherein the pipe is axially moveable into contact with the deflector upon rotation of the first and second rollers.

2. The pipe extractor of claim 1, wherein the first roller is radially fixed and the second roller is radially slidable towards and away from the first roller.

3. The pipe extractor of claim 2, further comprising a hydraulic actuator to control the sliding movement of the second roller.

4. The pipe extractor of claim 1, wherein the first roller and second roller are radially slidable towards and away from each other.

5. The pipe extractor of claim 4, further comprising at least one hydraulic actuator to control the sliding movement of the first and second rollers.

6. The pipe extractor of claim 1, wherein the at least one motor comprises a first motor for driving rotation of the first roller and a second motor for driving rotation of the second roller.

7. The pipe extractor of claim 1, further comprising a planar surface substantially perpendicular to the axis of the pipe for supporting the pipe extractor against the wall of the excavation pit through which the pipe is being extracted.

8. The pipe extractor of claim 1, wherein an outer surface of at least one of the first roller and second roller further comprises axially extending grooves.

9. The pipe extractor of claim 1, further comprising a coupling for releasably mounting the pipe extractor to a construction vehicle.

10. A method of extracting a subterranean pipe from ground, the method comprising:
   positioning a pipe extractor in an excavation pit in the ground adjacent to a leading end of the subterranean pipe, the pipe extractor comprising:
      a first roller,
      a second roller radially opposed from the first roller,
      at least one motor configured to drive rotation of the first and second rollers in opposing directions, and
      a deflector positioned adjacent to the first and second rollers;
   feeding the leading end of the pipe through a wall of the excavation pit opposite the deflector and between the first roller and the second roller; and
   actuating the at least one motor to drive rotation of the first and second rollers, wherein the rotation of the first and second rollers causes axial movement of the pipe and directs the pipe into contact with the deflector.

11. The method of claim 10, further comprising the step of radially sliding the second roller towards the first roller to radially compress the pipe.

12. The method of claim 11, wherein the sliding movement of the second roller is controlled by a hydraulic actuator.

13. The method of claim 10, further comprising the step of radially sliding the first and second rollers towards each other to radially compress the pipe.

14. The method of claim 13, wherein the sliding movement of the first and second rollers is controlled by at least one hydraulic actuator.

15. The method of claim 10, further comprising the step of controlling the speed of the at least one motor.

16. The method of claim 10, wherein the at least one motor comprises a first motor for driving rotation of the first roller and a second motor for driving rotation of the second roller.

17. The method of claim 10, wherein the pipe extractor further comprises a planar surface substantially perpendicular to the axis of the pipe for supporting the pipe extractor against the wall of the excavation pit through which the pipe is being extracted.

18. The method of claim 10, further comprising the step of mounting the pipe extractor on a construction vehicle.

19. The method of claim 10, further comprising the step of attaching a second pipe to a trailing end of the subterranean pipe being extracted.

\* \* \* \* \*